(12) United States Patent
Vasseur et al.

(10) Patent No.: US 8,073,788 B2
(45) Date of Patent: Dec. 6, 2011

(54) ANALYSIS OF POWDER METAL PRODUCTION OF A COMPONENT

(75) Inventors: Brett Vasseur, Geneva, IL (US); Kevin Skibinski, Geneva, IL (US); Vince Perez, South Elgin, IL (US)

(73) Assignee: Burgess-Norton Mfg. Co., Inc., Geneva, IL (US)

( * ) Notice: Subject to any disclaimer, the term of this patent is extended or adjusted under 35 U.S.C. 154(b) by 884 days.

(21) Appl. No.: 12/151,112

(22) Filed: May 5, 2008

(65) Prior Publication Data

US 2009/0276375 A1   Nov. 5, 2009

(51) Int. Cl.
G06Q 99/00 (2006.01)
G06Q 30/00 (2006.01)

(52) U.S. Cl. ...................... 705/500; 705/7.11

(58) Field of Classification Search ................. 705/7.11, 705/14.4, 500
See application file for complete search history.

(56) References Cited

U.S. PATENT DOCUMENTS

| | | | | |
|---|---|---|---|---|
| 5,963,795 A | * | 10/1999 | Schneider et al. | ............ 438/122 |
| 2004/0078308 A1 | * | 4/2004 | Michaluk | ........................ 705/34 |
| 2004/0167789 A1 | * | 8/2004 | Roberts et al. | .................... 705/1 |
| 2006/0185170 A1 | * | 8/2006 | Lewis et al. | ................ 29/896.11 |
| 2006/0221387 A1 | * | 10/2006 | Swift et al. | ................... 358/1.15 |

FOREIGN PATENT DOCUMENTS

KR   2002085907 A   * 11/2002

OTHER PUBLICATIONS

Anon., "Single-Day Tariff Tried," Power in Asia, No. 221, p. 18, Mar. 10, 1997.*
Anon., "Construction Sector Continues to Develop," Polish News Bulletin, Jul. 26, 2005.*

* cited by examiner

*Primary Examiner* — Nicholas D Rosen
(74) *Attorney, Agent, or Firm* — Edward J. Brosius

(57) ABSTRACT

A method of calculating the cost saving for producing a metallic component by the use of a powder metal process is provided. The method includes the steps of analyzing the current production method of the component, usually machining, to determine the current unit cost. The customer would agree to purchase an agreed supply of components for an agreed period of time. The production of the component utilizing powder metal process is then analyzed to determine the powder metal unit cost. The savings for production of the component utilizing the powder metal process is then presented to the customer. The customer would, then agree to purchase an agreed supply of components.

14 Claims, 1 Drawing Sheet

ANALYSIS OF POWDER METAL PRODUCTION OF A COMPONENT

BACKGROUND OF THE INVENTION

The invention provides an analytical method of calculating and analyzing the powder metal production of a component or part. Traditionally, such components or parts are made of ferrous metal which is usually cut to size from a stock bar or similar starting piece, and then machined to the final component configuration. Such parts include gears, bushings, spacers, and a myriad of ferrous metal components. More often than not, the beginning material is typically wrought steel or cast steel.

It can be readily understood that the complexity and cost associated with machining such parts are considerable. Such machining requires several steps, even with the use of modern computer numerical control machining centers. Further, the amount of metal lost when machining openings in parts such as spaces between teeth in a gear or central openings in a bushing or a spacer, results in unnecessary production of waste or scrap metal.

An alternative to such machining of components such as spacers, bushings, and gears and other similar parts is to produce the component using a powder metallurgy process. The powder metallurgy process involves the steps of providing a suitable powder metal of desired alloy, designing a die that will result in a near final configuration of the component, compacting the powder metal in the die to form a powder metal blank, sintering the powder metal blank to improve the characteristics of the blank, which usually involves an improved density, possibly re-compacting the sintered blank, and then subjecting the sintered blank to the usual tempering or quenching operations to achieve the desired final metallurgical structure of the component. A minimum of final machining will then be needed to bring the component to the desired final shape.

The advantages of such powder metal production operations are obvious in that significant amounts of machining are eliminated, that the generation of scrap metal is greatly reduced as the initial die compaction is to a near final shape of the component, and that the final component can usually be produced at a significantly reduced cost from the traditional machining operations.

Accordingly, it is an object of the present invention to provide a method of analyzing the powder metal production of a component to calculate the savings for the production of such component compared to the traditional machining production method for the component.

SUMMARY OF THE INVENTION

An analytical method was developed to review the potential savings in manufacturing a component using a powder metallurgy process.

First, the manufacturing and technical capabilities of the powder metallurgy process are outlined to the potential customer. This presentation is usually followed by a plant tour to better understand the current manufacturing processes used by the customer to produce the component. As the component is usually a ferrous metal part, the current manufacturing process usually is a machining operation.

Next, the customer is provided a preliminary assessment of whether and how powder metallurgy processes can be applied in the manufacture of the components.

If the customer agrees to further pursue the powder metallurgy manufacturing analysis, a confidentiality and supply agreement is signed wherein a three year requirement supply of components that detailed analysis will show can be supplied at a 20% or more cost savings.

A detailed parts analysis is then performed to identify the exact components that will be manufactured by a powder metallurgy process. The customer would provide verified cost information for the current manufacturing process for each chosen component.

A detailed guaranteed savings summary is then provided to the customer. This summary identifies each component and the guaranteed manufacturing cost savings to produce the component using a powder metallurgy process. The customer would then agree to a requirement supply for an agreed period, usually 3 years or more of the components that can be supplied at or greater than a 20% savings, and may, at its option, agree to purchase other components at less than the 20% savings.

The customer than agrees to a requirement production order for the agreed components for at least the agreed period.

BRIEF DESCRIPTION OF THE DRAWING

In the drawing, FIG. 1 of a flow chart of the steps in accordance with an embodiment of the present invention.

DETAILED DESCRIPTION OF THE INVENTION

Figure 1:
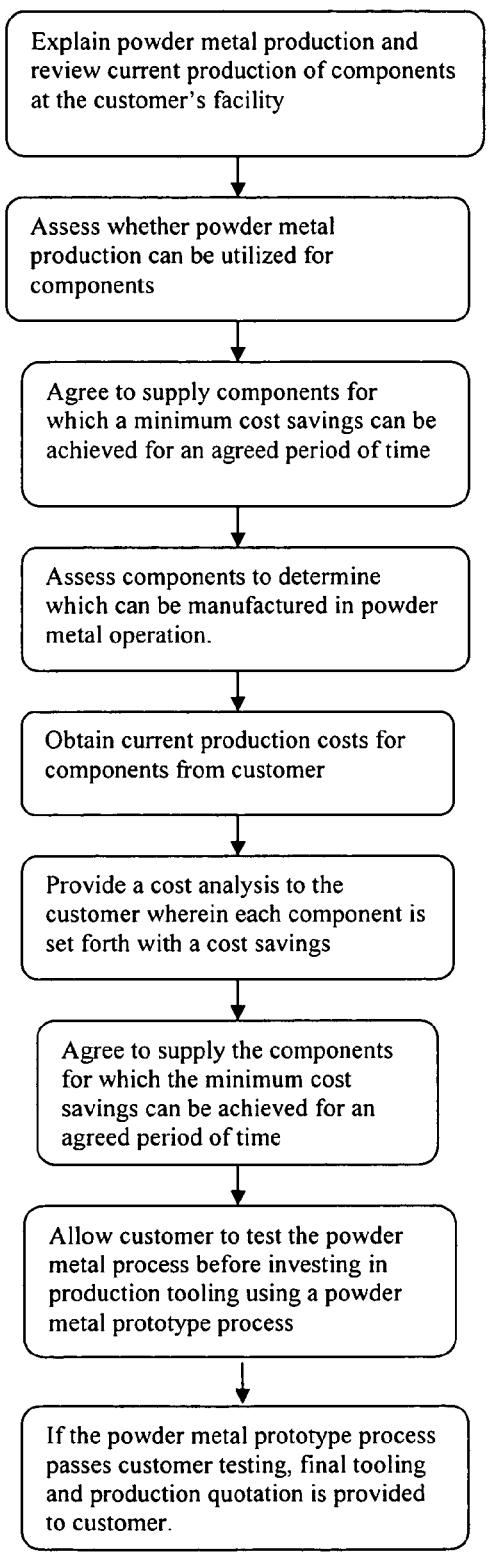

An analytical method was developed to determine the cost savings possible from the production of a metallic, usually ferrous metal and further usually a wrought steel or cast, component in comparing the traditional production method for the component utilizing machining methods compared to the production of the component utilizing a powder metal process.

The analytical method utilizes the steps of initially presenting the capability of the powder metal manufacturing process to produce components to the customer. This is usually followed by a site visit wherein the current production method for producing the metallic component is then analyzed. Both of such analyses usually involve a visit to the customer to review the current production of the component. Such current production usually involves machining of the component, possibly using computer numerical controlled machining centers.

Next, the customer is asked to sign an agreement whereby, if it can be shown that a 20% or more savings can be achieved by the powder metal production of any components, the customer will purchase its requirements of such components for an agreed period, usually at least 3 years.

Next, the various components are analyzed to determine if any are amenable to production utilizing a powder metal process. Many components, such as spacers, bushings, gears and gears can be produced using a powder metal process. However, certain components due to their configuration are not amenable to production utilizing a powder metal process.

The customer could provide the current production cost information for such components. If it is determined any the component is of a design that can be produced utilizing a powder metal process, or if slight modifications to the component can result in a design that is amenable to production by a powder metal process, the production of the component utilizing a powder metal process is then analyzed to determine the unit cost of production of the component utilizing a powder metal process. Such analysis could induce optimization of the design of the component.

The savings for production of a component utilizing a powder metal process is then determined by comparing the unit cost of producing the component utilizing current machining methods compared to the unit costs of producing the component utilizing the powder metal process. Such savings would be guaranteed in an analysis.

For those components for which a 20% or greater cost savings can be achieved, the customer would agree to a requirement supply contract for an agreed period usually at least 3 years. For those components for which a less than 20% cost savings can be achieved, the customer would decide if they wanted to enter into a supply contract.

If agreed with the customer after presentation of the savings for production of the component utilizing a powder metal process, test production of the component utilizing a powder metal process is then performed. The component is analyzed to assure that it meets the customer's metallurgical and other performance requirements.

Before expensive production tooling is invested, a prototype stage is usually taken by the customer to test the performance of a component utilizing the powder metal process. The steps are as follows: Powder metal slugs sometimes called "blanks" are made from an inexpensive round set of tooling using a suitable powder metal of desired alloy and properties. The raw powder metal is appropriately blended with lubricants to prepare it for the compacting process. The compacting press then compresses the powder metal using the round tooling to create a slug that will then be sintered. The slug can then be machined, heat treated and finished depending on the customer's part requirements.

If prototypes pass customer performance testing, a final tooling and cost quotation for the mass production of the component utilizing a powder metal process is provided to the customer.

Finally, a final tooling and production cost quotation for the production of the component utilizing a powder metal process is provided to the customer.

EXAMPLE CALCULATION

Example 1

An example calculation for calculating the cost savings for production of a component utilizing a powder metal process from the current production method of machining component is as follows.

A bushing of wrought steel is currently produced by a customer utilizing traditional machining methods at a 50,000 unit basis at a current landed price of $1.25 unit cost. This results in an annual cost for the 50,000 components of $62,500.

Upon analysis of the bushing, it was determined that the bushing could be produced at a unit cost of $0.999. Accordingly, a quotation was provided to the customer for providing 50,000 bushings at an annual cost of $49,925. This results in a 20% cost savings over the traditional machining manufacture of the bushing.

Example 2

An example calculation for calculating the cost savings for production of a component utilizing a powder metal process from the current production method of machining component is as follows.

A clutch hub of a stainless steel is currently produced by a customer utilizing traditional machining methods at a 65,000 unit basis at a current landed price of $5.125 unit cost. This results in an annual cost for the 65,000 components of $333,125.

Upon analysis of the clutch hub it was determined that the clutch hub could be produced at a unit cost of $4.093. Accordingly, a quotation was provided to the customer for providing 65,000 clutch hubs at an annual cost of $266,403. This results in a 20% cost savings over the traditional machining manufacture of the clutch hub.

What is claimed is:

1. A method for calculating the cost savings for producing a component utilizing a powder metallurgy process, the method comprising the steps of:
    analyzing current production methods for the component to determine a unit cost for such current production methods and to determine whether the component can be produced utilizing a powder metallurgy process;
    obtaining agreement to supply the requirements of the component or a plurality of components if a minimum cost savings can be achieved;
    analyzing production of the component utilizing a powder metallurgy process to determine a unit cost for such component utilizing a powder metallurgy process;
    quoting such unit cost for the production of such component utilizing a powder metallurgy process, and the associated cost savings for producing the component utilizing a powder metallurgy process compared to the current production methods;
    and agreeing to supply the requirements of any component for which the minimum cost savings can be achieved for an agreed period of time;
    providing a test tooling and production purchase order;
    and conducting test production of the component utilizing a powder metallurgy process.

2. The method of claim 1,
    wherein current methods for producing the component include machining the component from a cut to size stock metal piece.

3. The method of claim 1,
    wherein the analyzing of current production methods includes an analysis of optimizing the design of the component.

4. The method of claim 1,
    further comparing providing a cost savings of at least 20%.

5. The method of claim 1,
    further comprising the steps of analyzing the test production of the component utilizing a powder metallurgy process and providing a final tooling and production quotation.

6. The method of claim 5,
    further comprising the steps of calculating the cost of final tooling and factoring a portion of such cost into the final tooling and production quotation.

7. The method of claim 6,
    further comprising the steps of entering into a guaranteed cost savings supply contract to supply the requirements of any such component for an agreed period of time.

8. A method of contracting for the production of a part using a powder metal process,
    the method comprising the steps of:
    assessing a part and its current production process;
    obtaining a unit cost for producing the part using the current production process;
    analyzing production of the part using a powder metal process to determine a unit cost for producing the part using a powder metal process;

agreeing to supply the part or a plurality of parts for which at least an agreed percent cost savings for production costs can be achieved;

comparing the unit cost for producing the part using the current production process and the unit cost for producing the part using a powder metal process;

agreeing to supply the agreed parts for which at least the agreed percent cost savings can be achieved; and conducting test production of the part using a powder metal process.

9. The method of claim 8, wherein current methods for producing the part include machining the part from a metal blank.

10. The method of claim 8, wherein the analysis of current production of the part includes an analysis of improving the design of the part.

11. The method of claim 8, further comprising the step of providing a production price analysis for each component with a guaranteed cost savings.

12. The method of claim 8, further comprising the steps of analyzing the test production of the part utilizing a powder metal process and providing a final tooling and production quotation.

13. The method of claim 12, further comprising the steps of determining the cost of final tooling and factoring a portion of such cost into the final tooling and production quotation.

14. The method of claim 13, further comprising the step of entering into a guaranteed cost savings contract.

* * * * *